United States Patent [19]

Guerrero

[11] Patent Number: 4,611,813

[45] Date of Patent: Sep. 16, 1986

[54] METHOD OF AND APPARATUS FOR PROVIDING AN ANNULAR SEAL

[75] Inventor: Hector N. Guerrero, Simsbury, Conn.

[73] Assignee: Combustion Engineering Co., Inc., Windsor, Conn.

[21] Appl. No.: 655,871

[22] Filed: Sep. 28, 1984

[51] Int. Cl.⁴ ............................................. F16J 15/06
[52] U.S. Cl. .......................................... 277/1; 277/4; 277/190
[58] Field of Search ....................... 277/1, 4, 9, 12, 32, 277/27, 117, 118, 116.2, 190, 191, 237 R

[56] References Cited

U.S. PATENT DOCUMENTS

| | | | |
|---|---|---|---|
| 3,207,523 | 9/1965 | Johnson | 277/190 X |
| 3,479,063 | 11/1969 | Raver | 277/190 X |
| 3,971,566 | 7/1976 | Levinsohn et al. | 277/1 X |
| 4,193,604 | 3/1980 | Sarvanne | 277/190 X |
| 4,281,841 | 8/1981 | Kim et al. | 277/1 X |
| 4,480,841 | 11/1984 | Schukei et al. | 277/190 X |

FOREIGN PATENT DOCUMENTS

| | | | |
|---|---|---|---|
| 684410 | 11/1939 | Fed. Rep. of Germany | 277/4 |
| 1593529 | 7/1970 | France | 277/4 |

Primary Examiner—Robert S. Ward

[57] ABSTRACT

Leakage producing faults in a guide tube of finite length are repaired by encapsulating the guide tube within a sleeve-like member which extends between a wall, from which the guide tube projects, and a housing which passes through the guide tube and extends beyond the end thereof. The sleeve-like member has resilient seals at the ends thereof, is pre-loaded to partially compress the seals and is shaped so that exposure thereof to a pressurized fluid will result in further compression of the seals.

18 Claims, 1 Drawing Figure

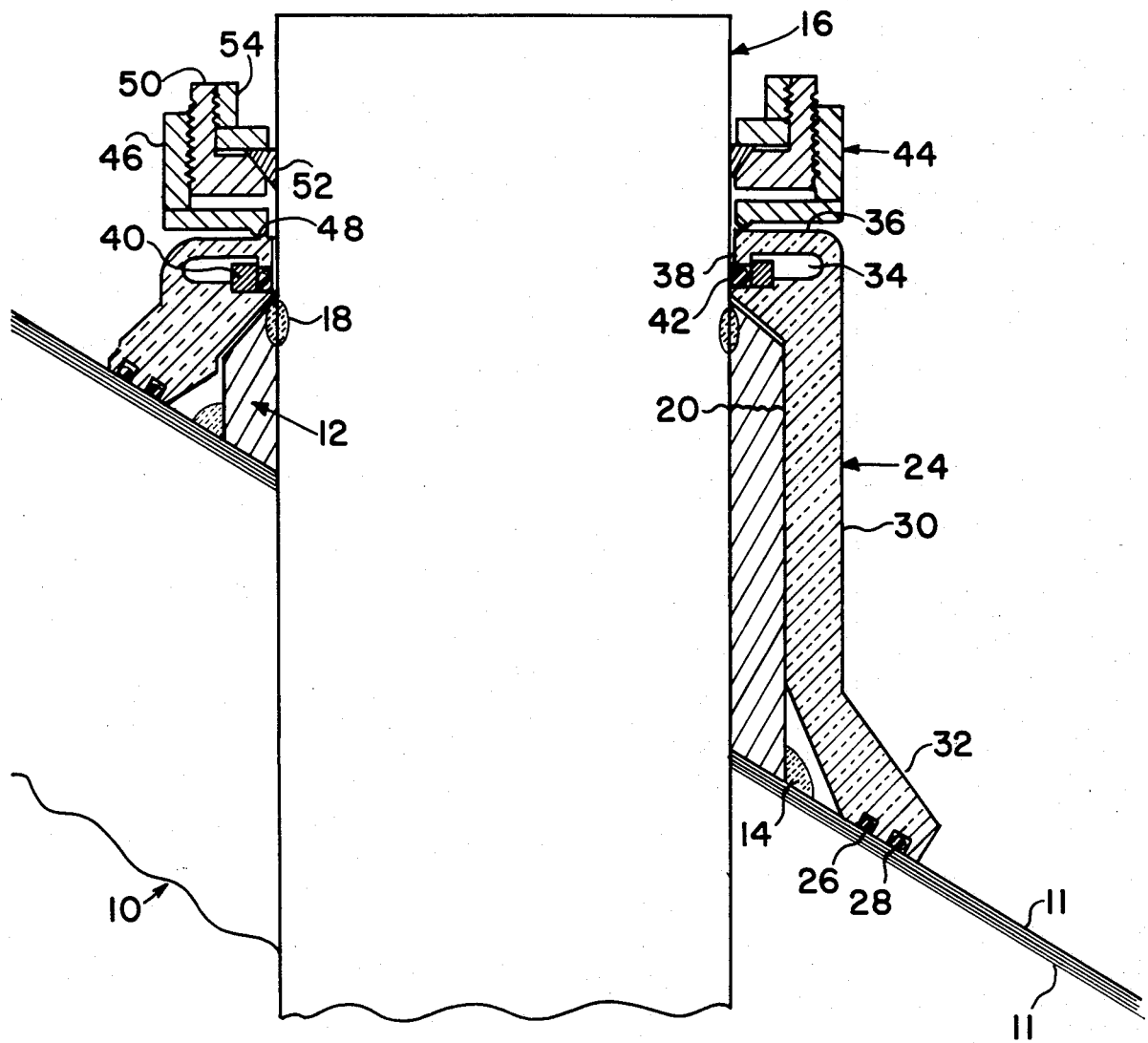

METHOD OF AND APPARATUS FOR PROVIDING AN ANNULAR SEAL

BACKGROUND OF THE INVENTION (1) Field of the Invention

The present invention relates to mechanical seals and particularly to sleeve-like apparatus for establishing a seal about a tubular stub which extends from the wall of a vessel. More specifically, this invention is directed to a leakage repair technique and especially to a method for preventing leakage through or around a control rod nozzle support stub which extends into a nuclear reactor pressure vessel from the wall thereof. Accordingly, the general objects of the present invention are to provide novel and improved apparatus and methods of such character.

(2) Description of the Prior Art

While not limited thereto in its utility, the present invention is particularly well-suited for use in the field of boiling water type nuclear reactors (BWR). It has been discovered that, during operation of a BWR, leakage of liquid coolant from within the reactor pressure vessel may occur in the vicinity of the control rod nozzles. These nozzles are supported by means of stub tubes which are welded to the interior of the reactor pressure vessel. The nozzles are conventionally located below the reactor core and are sealed to the stub tubes by means of welds. The stub tubes, in turn, are welded to the pressure vessel. Should, by way of example only, a crack develop in a stub tube, the pressurized fluid within the reactor vessel may leak into the annular space between the stub tube and control rod nozzle and escape from the pressure vessel via this annular space. Since the liquid within the pressure vessel is directly exposed to the reactor core, it will be radio-active and any leakage thereof must be immediately terminated.

Copending application Ser. No. 434,092, filed Oct. 13, 1982, now U.S. Pat. No. 4,480,841, which is assigned to the assignee of the present invention and which is incorporated herein by reference, discusses in greater detail the above-mentioned problem of leakage resulting from reactor pressure vessel stub tube cracking. Application 434,092 also discloses novel apparatus which may be installed on a defective stub tube to prevent further leakage therethrough. The apparatus of the co-pending application performs its intended function efficiently and is useful in many applications.

In some reactor installations the sub tubes which support the control rod nozzles are very short, i.e., such stub tubes may for example be only one inch high. Further, while a stub tube crack appears to be the most prevelant possible cause of leakage about the control rod nozzles, it is possible that a crack could occur in the weld by which the stub tube is joined to the inner wall of the pressure vessel. The apparatus of the referenced co-pending application is not suitable for use with very short stub tubes and is not capable of correcting a leakage problem which occurs at or very close to the plane of the reactor pressure vessel wall.

It should also be noted that the establishment of a seal to the inner wall of a nuclear reactor pressure vessel is greatly complicated by the fact that such wall is provided with overlapping cladding strips which define an uneven surface. Again by way of example only, a BWR pressure vessel internal wall may be clad with stainless steel strips which are one inch wide and, in the regions of overlap between the strips, valleys approximately one eighth inch deep will be defined.

SUMMARY OF THE INVENTION

The present invention overcomes the above-briefly discussed and other deficiencies and disadvantags of the prior art by providing a novel and improved technique for establishing a leak-proof seal about a tubular member, particularly a tubular member of short length which extends outwardly from a surface, and a sealing sleeve sub-assembly for use in the practice of this novel technique. Apparatus in accordance with a preferred embodiment of the invention comprises a sleeve subassembly which, at a first end thereof, is capable of establishing a leak-proof seal to the irregular surface of a wall from which the tubular member extends. The sleeve sub-assembly has a length which exceeds that of the tubular member and, at its other end, is provided with means for establishing a leak-proof seal to a conduit, for example a control rod nozzle, which passes through the tubular member and is joined thereto, for example by welding. Apparatus in accordance with the present invention also includes a novel pre-loading mechanism which generates a force having the appropriate directional components to compress the seals at the opposite ends of the sleeve sub-assembly against the abutting surfaces.

Also in accordance with the preferred embodiment, the sleeve sub-assembly of the present invention is designed so that, when installed in a pressurized vessel, the pressure of the environment will enhance the sealing action at both ends of the sleeve sub-assembly. Thus, the pre-loading mechanism will establish seals which, in an unpressurized environment, will be adequate to prevent leakage. If the environment is pressurized, the seal integrity will be enhanced by the cooperation between the sleeve sub-assembly and pressurized fluid. Accordingly, the present invention may be employed in the environment of a boiling water-type nuclear reactor and will establish a leak-tight seal in the "cold" or unpressurized condition of the reactor and the reactor internal pressure will aid in maintaining a fluid-tight seal when the reactor vessel is pressurized.

The pre-loading mechanism in accordance with the preferred embodiment of the invention is entirely separate from the sealing sleeve sub-assembly thus contributing to a simplified sleeve sub-assembly construction. The pre-loading mechanism, in the above-discussed BWR reactor environment, establishes a tight mechanical connection to the control rod nozzle which extends through the tubular member to be sealed. The pre-loading mechanism generates a force which is applied to a flexible portion of the sleeve sub-assembly whereby the seals at both ends thereof are placed in compression. Further in accordance with the preferred embodiment of the invention, an arrangement of primary and secondary seals may employed to establish a fluid-tight seal between a vessel wall and a first end of the sealing sleeve sub-assembly. This double seal, and the sealing elements employed therein, compensate for the uneven surface of the vessel wall with which the fluid-tight seal must be established.

BRIEF DESCRIPTION OF THE DRAWING

The present invention may be better understood and its numerous objects and advantages will become apparent to those skilled in the art by reference to the accompanying drawing which is a side elevation view, partly in section, depicting apparatus in accordance with the preferred embodiment of the present invention in the environment of a nuclear reactor pressure vessel.

DESCRIPTION OF THE DISCLOSED EMBODIMENT

With reference now to the drawing, the wall of the bottom head of a nuclear reactor pressure vessel is indicated generally at 10. The inside of wall 10 is provided with a cladding 11. A stub tube, indicated generally at 12, is welded to the inside of wall 10 as indicated at 14. Stub tube 12 extends about the inner periphery of an aperture in the wall 10 of the pressure vessel, the aperture having been formed subsequent to application of the cladding. A nozzle tube, indicated generally at 16, extends through stub tube 12 and the pressure vessel wall 10. Nozzle tube 16 carries control rods which pass upwardly into the reactor core (not shown). The stub and nozzle tubes 12, 16 are joined to one another by means of an annular seal weld which has been indicated at 18. In practice the stub tube 12 may, at one side thereof, be only one inch in length.

During reactor operation a crack 20 could conceivably develop in stub tube 12 as a result of the residual stresses in this part and the harsh operating environment. Should a crack 20 occur, high pressure reactor cooling fluid could pass through the crack and flow downwardly through the annulus formed between stub tube 12 and nozzle tube 16. Any such leakage might result in the escape of radioactive liquid from the pressure vessel and thus cannot be tolerated. Repair or replacement of a cracked stub tube is not a practical solution should a crack 20 occur. The stub tubes and their associated control rod nozzles are located in the lower portion of the reactor pressure vessel beneath the fuel assemblies which comprise the reactor core. Thus, replacement or repair of a cracked stub tube would require removal of all of the fuel assemblies and associated support structure from the reactor vessel and complete draining of the reactor cooling fluid in order to provide access to the stub tube. Also, in a nuclear reactor which has been in operation for even a short time, the interior of the reactor vessel will have become radioactive and thus repair operations cannot be performed in the customary manner, i.e., a workman could not simply be assigned to the task of rewelding a cracked stub tube.

It has been proposed, see for example referenced co-pending application Ser. No. 434,092, to install a sleeve over a cracked stub tube and seal the sleeve to the tube below the defect and to the nozzle tube above the defect. This approach, however, cannot be implemented in the case of a very short stub tube since there is an insufficient smooth surface area extending completely around the exterior of the stub tube with which a fluid-tight seal can be established. The lack of a smooth annular stub tube exterior wall surface may, in part, be attributable to distortion resulting from the heat to which the stub tube is exposed during formation of welds 14 and 18. Further, it is possible that the crack will have occurred in or will spread to the region of the weld 14 in which case establishing a seal with the side of the stub tube will be of no remedial effect. The complete encapsulation of the stub tube, however, has not previously been deemed possible, and thus a viable approach to rectifying a stub-tube failure problem, since such encapsulation requires that a sealing relationship be established with the inside of pressure vessel wall 10. As noted above, the vessel wall is provided with a cladding which will typically be defined by overlapping stainless steel strips. These strips will typically be on the order of one inch in width and will define, at the overlaps therebetween, valleys which are approximately one/eighth inch deep.

In accordance with the present invention a sealing sleeve sub-assembly, indicated generally at 24, will be installed over the stub tube 12 and will extend from the inside of vessel wall 10, in a region about the outer periphery of the weld zone 14, to the nozzle tube 16 in an annular region above the most inwardly disposed end of stub tube 12. In the disclosed embodiment sleeve subassembly 24, at its lower end, carries an annular primary seal 26 and an annular secondary seal 28, seals 26 and 28 being in contact with the cladding 11 on the inside of vessel wall 10. It may, however be possible to eliminate the secondary seal 28. Sleeve sub-assembly 24 has an intermediate section 30 which is generally co-axial with tubes 12 and 16. As may be seen from FIG. 1, the straight or co-axial portion 30 of sleeve sub-assembly 24 will narrow in the upward direction of the slope of vessel wall 10 and, in fact, may not extend about the entire periphery of the sleeve. Sleeve sub-assembly 24 also has a lower "flange" portion 32 which is outwardly divergent as shown. Portion 32 of sleeve sub-assembly 24 carries the seals 26 and 28. Portion 32 of sleeve sub-assembly 24 is shaped such that the pressurized coolant within the vessel will act thereon to develop a compressive force which is applied to seals 26 and 28 thus enhancing the sealing action when the reactor is in operation.

Continuing to refer to the drawing, the upper end of the sleeve sub-assembly 24 is provided with an inwardly converging portion which has an inner diameter which approximates the outer diameter of nozzle tube 16. The upper end of sleeve sub-assembly 24, which is thus of greater wall thickness than the intermediate portion 30 thereof, is provided with a cut-out 34 which extends inwardly from the side of the sleeve which faces the nozzle tube 16. The cut-out 34 defines a flexible arm extention 36 at the upper end of sleeve sub-assembly 24, arm extension 36 having a certain degree of resiliency and functioning as a seal follower. The free end of arm 36, i.e., the end which will be positioned in closest proximity to the nozzle tube 16, defines an annular-shaped force transmitting projection 38. At the side of cut-out 34 which is opposite from projection 38, the cut-out is provided with a recess which terminates at an inner shoulder. A metal backing ring 40 is positioned by this shoulder and serves as a back-up member for a sealing ring 42. The sealing ring 42, in the nuclear reactor environment, will typically be comprised of pure graphite since this material possesses sufficient resiliency while not degrading as a result of exposure to nuclear radiation. Suitable seal material is sold under the trademark "GRAPHOIL" by Crane Packing Company, Morton Grove, Ill. The construction and mounting of sealing ring 42 are such that, upon transmission of a compressive force thereto via projection 38, the sealing ring 42 will be deformed and will establish a fluid-tight seal about the periphery of the nozzle tube 16.

The apparatus in accordance with the present invention also comprises pre-loading means for producing a force which will both urge the sleeve sub-assembly 24 downwardly, whereby a sealing relationship will be established between the vessel wall 10 and the seals 26 and 28, and simultaneously will cause the compression of the sealing ring 42 to establish a seal between sleeve sub-assembly 24 and nozzle tube 16. The pre-loading means in accordance with a preferred embodiment of the invention has been indicated generally at 44. The pre-loading means 44 comprises an internally threaded, L-shaped nut member 46. The base or leg of member 46 is provided, at its free end, with a generally transversely extending projection 48 which contacts the top of sleeve sub-assembly 24 adjacent the free end of the arm extension 36 thereof. L-shaped member 46 is engaged by a further generally L-shaped intermediate nut member 50 which is both internally and externally threaded as shown. The leg portion of member 50 is provided with a beveled front edge. Member 50 cooperates with an annular wedge member 52 which has a surface complementary in shape to the beveled surface on member 50. The wedge member 52 is captured between member 50 and the outside of nozzle tube 16 by a further, externally threaded L-shaped member 54. During installation the members 46 and 50 will be engaged and will be installed on nozzle tube 16 with the projection 48 in contact with the upper end of sleeve sub-assembly 24. The wedge member 52 will then be placed in position. Subsequently, the member 54 will be engaged with member 50 and will be tightened downwardly to thereby establish a tight mechanical connection between the pre-loading means 44 and the nozzle tube 16. This mechanical connection may be enhanced by providing a slight undercut on wedge member 52.

With the pre-loading means 44 firmly locked, i.e., wedged, against the exterior of nozzle tube 16, the nut member 46 will be rotated so as to cause this member to advance toward the top of sleeve sub-assembly 24. This rotation will be accomplished by use of a hydraulic turning tool as described in co-pending application Ser. No. 434,092. The downward advance of nut 46 will produce a force which will cause the flexing of arm extension 36 and the resulting compression of seal ring 42 to thereby establish a fluid-tight seal between sleeve sub-assembly 24 and nozzle tube 16. The downwardly directed force resulting from the advance of nut 46 will also cause the entire sleeve sub-assembly 24 to be urged downwardly whereby the seals 26 and/or 28 will be compressed thus forming a fluid-tight seal between the pressure vessel wall and sleeve sub-assembly 24. As noted above, when the reactor vessel is pressurized, the pressurized coolant will act on lower flange portion 32 of sleeve sub-assembly 24 thus producing a force which enhances the seal between the vessel wall and the sleeve. The coolant will also act on the straight side portion 30 and arm extension 36 of sleeve sub-assembly 24 to generate forces which enhance the seal between the sleeve sub-assembly 24 and nozzle tube 16.

The seals 26 and/or 28 may be comprised of a "Graphoil" ribbon and stainless steel shims. By way of example only, rings consisting of one or more turns of a stainless steel ribbon may be employed as spacers between "Graphoil" seals comprising multiple turns of spirally wound graphite ribbon. The seal ring preform, which has alternate steel and graphite layers, will be pressed to define the actual seal ring wherein the layers have an undulating configuration when the ring is viewed in cross-section.

To summarize the present invention, the sealing sleeve extends from the control rod housing or nozzle to the wall of the reactor vessel. The lower seal or set of seals cooperates with the clad surface of the reactor vessel wall and, consequently, the apparatus covers any crack that might exist or occur in the vessel weld region as well as in the stub tube itself. The sealing action of the present invention is enchanced, and in fact is primarily provided, by reactor internal pressure rather than resulting from a residual stress in a sleeve or a sleeve housing which is initiated by an installation tool. The sealing sleeve of the present invention is designed such that a reactor internal pressure of 1000 psig acting on the sleeve flange 32 and sleeve body results in a loading force on the lower seal of 50,000 lbs. Restated, the sleeve sub-assembly 24 is designed such that the ratio of sleeve projected area to seal area will result in a ratio of seal pressure to reactor pressure of at least four.

The upper seal 42 will also be loaded by the action of reactor pressure on both the side area of the sleeve and the flexible arm extension 36 of the sleeve which functions as a seal follower. Thus, the pre-loading means 44 needs only produce a small initial pre-load, for example 100 psi, to prevent leakage during cold start-up. This relatively small pre-load is, however, sufficient to seal any crack when the pressure vessel is in the unpressurized condition. The pre-loading means 44 also acts to impose a minimum sealing pressure during transients when the reactor pressure decays to zero and thus the problem of resealing is obviated.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for establishing a fluid-tight seal about a first tubular member which extends outwardly from a surface, the tubular member having an axis, said apparatus comprising:

tubular sleeve means, said sleeve means having an axis and a first outwardly diverging end portion, said sleeve means having a second end portion oppositely disposed with respect to said first end portion;

first annular seal means, said first seal means being mounted on said sleeve means first end portion, said first seal means being positioned so that a surface thereof will face in a first direction and will be in contact with the surface from which the first tubular member extends when said sleeve means is located coaxially with the first tubular member;

second annular seal means, said second seal means being mounted on said sleeve means second end portion, said second seal means being positioned so that a surface thereof will face in second direction which is different than said first direction, said second direction being generally toward the axis of said sleeve means;

means for delivering a compressive force to said second seal means; and pre-loading means, said pre-loading means being mechanically coupled to said delivering means and generating a force which is coupled to said sleeve means via said delivering means, said first and second seal means being biased by the force generated by said pre-loading means and being further compressed in response to the immersion of said sleeve means in a pressurized fluid.

2. The apparatus of claim 1 wherein said sleeve means has a greater length than the first tubular member and wherein said sleeve means second end portion at least in part has an inner diameter which is less than that of said sleeve means first end portion whereby said second seal means will be in contact with the exterior of a second tubular member which extends through the first tubular member.

3. The apparatus of claim 1 wherein said force delivering means is integral with said sleeve means and is flexible.

4. The apparatus of claim 2 wherein said force delivering means is integral with said sleeve means and is flexible.

5. The apparatus of claim 1 wherein said sleeve means first end portion has an inner diameter which converges from the first end of said sleeve means to a diameter which closely approaches the outer diameter of the first tubular member.

6. The apparatus of claim 4 wherein said sleeve means first end portion has an inner diameter which converges from the first end of said sleeve means to a diameter which closely approaches the outer diameter of the first tubular member.

7. The apparatus of claim 3 wherein said force delivering means is an elongated member having a free end and has a reaction surface which defines a plane which is oriented generally transverse to said sleeve axis.

8. The apparatus of claim 7 wherein said preloading means is coupled to said delivering means in a region adjacent the free end of said elongated member.

9. The apparatus of claim 8 wherein said sleeve means has a greater length than the first tubular member and wherein said sleeve means second end portion at least in part has an inner diameter which is less than that of said sleeve means first end portion whereby said second seal means will be in contact with the exterior of a second tubular member which extends through the first tubular member.

10. The apparatus of claim 9 wherein said pre-loading means is adjustable and engages the exterior of the second tubular member.

11. The apparatus of claim 10 wherein said sleeve means first end portion has an inner diameter which converges from the first end of said sleeve means to a diameter which closely approaches the outer diameter of the first tubular member.

12. The apparatus of claim 11 wherein said first seal means comprises a pair of spacially displaced generally annular shaped ring seals.

13. The apparatus of claim 11 wherein said second seal means comprises a ring seal and means for positioning said ring seal in alignment with the region of contact between said pre-loading means and said delivering means whereby the force generated by said preloading means will be transmitted to said ring seal via said elongated member to cause compression of said ring seal in a first direction which is generally parallel to the axis of said sleeve means and expansion of said ring seal in a direction generally transverse to said first direction.

14. The apparatus of claim 13 wherein said first seal means comprises a pair of spacially displaced generally annular shaped ring seals.

15. A method for the encapsulation of a guide tube which extends from a surface comprising the steps of:
    installing a sleeve-like member over the guide tube, the sleeve-like member having at least a pair of differently angled reaction surfaces at the opposite ends thereof, the sleeve-like member supporting compressible seals adjacent the opposite ends thereof, a compressible seal at a first end of the sleeve-like member facing an extension of the axis of the guide tube and a flexible seal at the second end of the sleeve-like member facing the surface from which the guide tube extends;
    applying an axial mechanical biasing force to the sleeve-like member to urge the sleeve-like member toward the surface from which the guide tube extends whereby a seal at the second end of the sleeve-like member will be compressed between the sleeve-like member and the surface from which the guide tube extends;
    delivering said applied force to a seal at the first end of the sleeve-like member to compress said seal in the axial direction whereby said seal will be caused to expand in a transverse direction and be compressed between the sleeve-like member and the exterior of an elongated member whch extends through the guide tube; and
    applying fluidic pressure to the reaction surfaces of the sleeve-like member to further compress the seals.

16. The method of claim 15 wherein the guide tube is a stub tube for a tubular housing of a control mechanism of a nuclear reactor, the surface from which the stub tube extends is the inner wall of the reactor pressure vessel and the step of applying a biasing force comprises:
    establishing a slip-proof mechanical connection to the exterior of the control mechanism housing;
    mechanically coupling the connection to the control mechanism housing to the first end of the sleeve-like member; and
    varying the length of said mechanical coupling.

17. The method of claim 16 wherein the step of applying a biasing force further comprises:
    flexing a portion of the sleeve-like member in response to the variation in the length of the mechanical coupling.

18. The method of claim 17 wherein the step of delivering comprises:
    converting the flexing of the portion of the sleeve-like member to axial compression of the seal at the first end of the sleeve-like member.

* * * * *